(12) United States Patent
Yang et al.

(10) Patent No.: US 11,249,592 B2
(45) Date of Patent: Feb. 15, 2022

(54) METHOD OF SPLITTING DISPLAY AREA OF A SCREEN AND ELECTRONIC DEVICE FOR PROCESSING THE SAME

(71) Applicant: Samsung Electronics Co., Ltd., Gyeonggi-do (KR)

(72) Inventors: Jieun Yang, Seoul (KR); Dongjun Shin, Seoul (KR); Eunju Lee, Seoul (KR); Hanju Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 664 days.

(21) Appl. No.: 14/996,533

(22) Filed: Jan. 15, 2016

(65) Prior Publication Data

US 2016/0210041 A1    Jul. 21, 2016

(30) Foreign Application Priority Data

Jan. 16, 2015  (KR) .......................... 10-2015-0007946

(51) Int. Cl.
*G06F 3/041* (2006.01)
*G06F 3/0484* (2013.01)
*G06F 3/0488* (2013.01)
*G09G 5/14* (2006.01)

(52) U.S. Cl.
CPC ...... *G06F 3/041661* (2019.05); *G06F 3/0488* (2013.01); *G06F 3/04842* (2013.01); *G06F 3/04845* (2013.01); *G06F 3/04847* (2013.01); *G06F 3/04883* (2013.01); *G06F 3/04886* (2013.01); *G09G 5/14* (2013.01);

(Continued)

(58) Field of Classification Search
CPC .. G06F 3/0481; G06F 3/0484; G06F 3/04883; G06F 3/04886; G06F 2203/04803; G06F 3/041661; G06F 3/04842; G06F 3/0488; G06F 3/04845; G06F 3/04847; G06F 2203/04104; G06F 2203/04808; G06F 3/14; G09G 5/14
See application file for complete search history.

(56) References Cited

U.S. PATENT DOCUMENTS 8,438,495 B1 *   5/2013   Gilra ..................... G06F 3/0481
                                                          715/781
9,104,440 B2 *   8/2015   Jarrett ................ G06F 3/04883
9,733,815 B2 *   8/2017   Xia ....................... G06F 3/0481
(Continued)

FOREIGN PATENT DOCUMENTS

CN          102486716 A       6/2012
CN          103002122 A       3/2013
(Continued)

OTHER PUBLICATIONS

European Search Report dated May 24, 2016.
(Continued)

*Primary Examiner* — Kieu D Vu
*Assistant Examiner* — Blaine T Basom
(74) *Attorney, Agent, or Firm* — Cha & Reiter, LLC

(57) ABSTRACT

Disclosed are a method of controlling a screen and an electronic device that includes a display that is functionally connected to the electronic device; and a controller that is configured to cause a display area of the display to be split into a first display area and a second display area in response to the detection of a multi-touch type split-screen input.

10 Claims, 14 Drawing Sheets

(52) U.S. Cl.
CPC .............. *G06F 2203/04104* (2013.01); *G06F 2203/04803* (2013.01); *G06F 2203/04808* (2013.01)

(56) References Cited

U.S. PATENT DOCUMENTS

| | | | |
|---|---|---|---|
| 2010/0081475 A1* | 4/2010 | Chiang | G06F 3/0483 455/564 |
| 2010/0248788 A1 | 9/2010 | Yook et al. | |
| 2011/0107272 A1* | 5/2011 | Aguilar | G06F 3/04815 715/853 |
| 2011/0175930 A1* | 7/2011 | Hwang | G06F 3/0481 345/629 |
| 2012/0139951 A1* | 6/2012 | Hwang | G06F 3/04883 345/665 |
| 2012/0176322 A1* | 7/2012 | Karmi | G06F 3/04883 345/173 |
| 2013/0072263 A1 | 3/2013 | Kim | |
| 2013/0135178 A1* | 5/2013 | Miyahara | H04M 1/72403 345/1.3 |
| 2013/0218464 A1* | 8/2013 | Chen | G06F 3/04883 701/533 |
| 2013/0326415 A1* | 12/2013 | Park | G06F 3/0488 715/835 |
| 2013/0346912 A1* | 12/2013 | Buening | G06F 3/0488 715/783 |
| 2014/0089832 A1 | 3/2014 | Kim et al. | |
| 2014/0089833 A1 | 3/2014 | Hwang et al. | |
| 2014/0173498 A1 | 6/2014 | Chae et al. | |
| 2014/0208276 A1 | 7/2014 | Park | |
| 2014/0325428 A1* | 10/2014 | Lee | G06F 3/0488 715/781 |
| 2014/0351748 A1 | 11/2014 | Xia et al. | |
| 2016/0132188 A1* | 5/2016 | Li | G06F 3/04883 715/769 |

FOREIGN PATENT DOCUMENTS

| | | |
|---|---|---|
| EP | 2 360 665 A | 8/2011 |
| EP | 2 530 561 A2 | 1/2012 |
| EP | 2 662 761 A1 | 11/2013 |
| KR | 10-2011-0063409 A | 6/2011 |
| KR | 10-2012-0133004 A | 12/2012 |
| KR | 10-2014-0040457 A | 4/2014 |

OTHER PUBLICATIONS

European Search Report dated Sep. 11, 2017.
Chinese Search Report dated Jul. 3, 2018.
Chinese Search Report dated Apr. 16, 2019.
Chinese Search Report dated Oct. 31, 2019.
Chinese Search Report dated May 7, 2020.
European Search Report dated May 28, 2020.
Korean Search Report dated Nov. 25, 2020.
European Search Report dated Mar. 29, 2021.
Korean Notice of Patent Grant dated May 27, 2021.

* cited by examiner

METHOD OF SPLITTING DISPLAY AREA OF A SCREEN AND ELECTRONIC DEVICE FOR PROCESSING THE SAME

CLAIM OF PRIORITY

This application claims the priority under 35 U.S.C. § 119(a) to Korean Application Serial No. 10-2015-0007946, which was filed in the Korean Intellectual Property Office on Jan. 16, 2015, the entire contents of which are hereby incorporated by reference.

TECHNICAL FIELD

The present disclosure generally relates to a method of controlling a screen and an electronic device for processing the method.

BACKGROUND

Electronic devices can support various functions (e.g., applications) that provide various services to users. In this case, the electronic devices may display an execution screen that corresponds to at least one of the functions. For example, the electronic devices may display a browser screen, a content reproduction screen, a message screen, a schedule screen, etc.

In addition, the electronic devices may also simultaneously display execution screens for a plurality of functions.

SUMMARY

In operation, the users of the electronic devices may have difficulty in splitting a screen in order to simultaneously display the plurality of execution screens. Namely, the users of the electronic devices have to request that the screen be split and select a function to be executed on the divided areas of the split screen. Such an operation may have to be repeated as many times as the number of split screens that are desired. That is, the process of selecting functions to be performed in the various areas of the split screen is time consuming and tedious.

Various embodiments of the present disclosure may provide a method of controlling a screen and an electronic device for processing the method in which a user of the electronic device can split a screen into a desired number of split screen areas and can easily select functions to be executed in the respective split screen areas in a relatively few number of steps.

In order to achieve the aforementioned objective or other objectives, a device for controlling a screen, according to various embodiments, may include: a display functionally connected to an electronic device; a detector that detects a multi-input signal; and a controller that displays the display area of the display that is split into a reference screen area and a split screen area in response to the detection of the multi-input signal. A screen of a running function may be displayed in the reference screen area and a screen of a function to be executed may be displayed in the split screen area.

A device for controlling a screen, according to various embodiments, may include: a display functionally connected to an electronic device; a detector that detects a single-input signal; and a controller that is configured to receive and/or determine information regarding at least one of a moving distance of the touch input, a moving direction of the touch input, and the area of the touch input in response to the detection of the single-input signal, and displays the display area of the display that is split into a reference screen area and a split screen area based on the information. A screen of a running function may be displayed in the reference screen area and the screen of a function to be executed may be displayed in the split screen area.

A computer readable recording medium, according to various embodiments, may have a program recorded therein for executing: an operation of detecting a multi-input signal; and an operation of splitting a display area into a reference screen area and a split screen area in response to the detection of the multi-input signal. A screen of a running function may be displayed in the reference screen area and a screen of a function to be executed may be displayed in the split screen area.

A computer readable recording medium, according to various embodiments, may have a program recorded therein for executing: an operation of detecting a single-input signal; and an operation of receiving or determining information regarding at least one of a moving distance of the touch input, a moving direction of the touch input, and the area of the touch input in response to the detection of the single-input signal and displaying the display area of the display that is split into a reference screen area and a split screen area based on the information. A screen of a running function may be displayed in the reference screen area, and a screen of a function to be executed may be displayed in the split screen area.

A method of controlling a screen, according to various embodiments, may include: detecting a multi-input signal and splitting a display area into a reference screen area and a split screen area in response to the detection of the multi-input signal. A screen of a running function may be displayed in the reference screen area and a screen of a function to be executed may be displayed in the split screen area.

A method of controlling a screen, according to various embodiments, may include: detecting a single-input signal and receiving or determining information regarding at least one of a moving distance of the touch input, a moving direction of the touch input, and the area of the touch input in response to the detection of the single-input signal and displaying the display area of the display that is split into a reference screen area and a split screen area based on the analysis result. A screen of a running function may be displayed in the reference screen area, and the screen of a function to be executed may be displayed in the split screen area.

These and other aspects of the present disclosure are described in more detail herein below.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
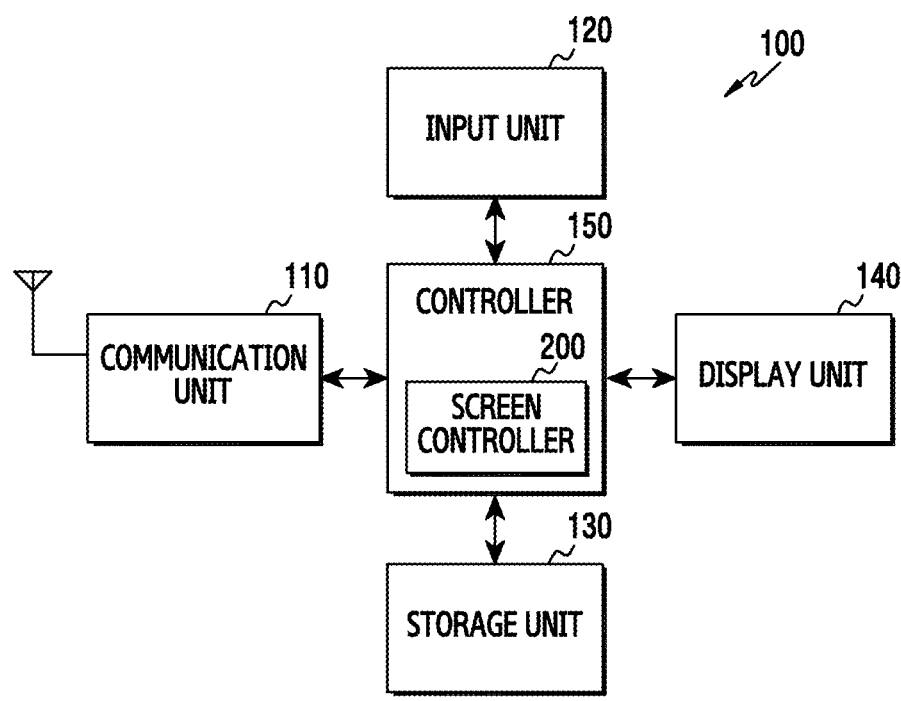
FIG. 1 is a block diagram of an electronic device according to various embodiments of the present disclosure.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiment, and modifications and changes may be made therein. Therefore, the present disclosure will be described in detail with reference to particular embodiments shown in the accompanying drawings. However, it should be understood that the present disclosure is not limited to the particular embodiments disclosed herein, but includes all modifications/changes, equivalents, and/or alternatives falling within the spirit and the scope of the present disclosure. In describing the drawings, like or similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

The module or program module according to various embodiments of the present disclosure may further include at least one or more constitutional elements among the aforementioned constitutional elements, or may omit some of them, or may further include additional other constitutional elements. Operations performed by a module, programming module, or other constitutional elements according to various embodiments of the present disclosure may be executed in a sequential, parallel, repetitive, or heuristic manner. In addition, some of the operations may be executed in a different order or may be omitted, or other operations may be added.

An electronic device according to various embodiments of the present disclosure may be a device. For example, the electronic device according to various embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; or a wearable device (e.g., a head-mount-device (HMD), an electronic glasses, an electronic clothing, an electronic bracelet, an electronic necklace, an electronic appcessory, an electronic tattoo, a smart mirror, or a smart watch).

In other embodiments, an electronic device may be a smart home appliance. For example, of such appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync™, Apple TV™, or Google TV™); a game console (e.g., Xbox™, PlayStation™); an electronic dictionary; an electronic key; a camcorder; or an electronic frame.

In other embodiments, an electronic device may include at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like)

In certain embodiments, an electronic device may include at least one of: a piece of furniture or a building/structure; an electronic board; an electronic signature receiving device; a projector; and various measuring instruments (e.g., a water meter, an electricity meter, a gas meter, or a wave meter).

An electronic device according to various embodiments of the present disclosure may also include a combination of one or more of the above-mentioned devices. Further, it will be apparent to those skilled in the art that an electronic device according to various embodiments of the present disclosure is not limited to the above-mentioned devices.

FIG. 1 is a block diagram of an electronic device according to various embodiments of the present disclosure.

Referring to FIG. 1, the electronic device 100, according to the various embodiments of the present disclosure, may include a communication unit 110, an input unit 120, a storage unit 130, a display unit 140, and a controller 150.

The communication unit 110 may perform communication in the electronic device 100. At this time, the communication unit 110 can communicate with an external device (not illustrated) in various communication schemes. In this case, the communication unit 110 may communicate with an external device (not illustrated) in various communication schemes. According to various embodiments, the communication unit 110 may perform at least one of wireless communication and wired communication. According to an embodiment, the communication unit 110 may connect to at least one of a mobile communication network and a data communication network. According to another embodiment, the communication unit 110 may perform short range communication. For example, the external device may include an electronic device, a base station, a server, and a satellite. Further, the communication scheme may include Long Term Evolution (LTE), Wideband Code Division Multiple Access (WCDMA), Global System for Mobile communications (GSM), Wi-Fi, Bluetooth, and Near Field Communication (NFC).

The input unit 120 may generate input data in the electronic device 100. In this case, the input unit 120 may generate input data in response to an input of a user of the electronic device 100. According to various embodiments, the input unit 120 may include at least one input means. For example, the input unit 120 may include a key pad, a dome switch, a physical button, a touch panel, a jog-shuttle, and a sensor. According to various embodiments, the input unit 120 may generate input data for requesting the split of a screen into a plurality of screens, input data for reconfiguring the split screens, and the like.

The storage unit 130 may store operating programs of the electronic device 100. In this case, the storage unit 130 may store programs (or applications) for executing various functions. Further, the storage unit 130 may store data generated while the functions are performed. According to various embodiments, the data stored in the storage unit 130 may be execution information associated with the functions.

According to an embodiment, the execution information may be associated with at least one of the following criteria: the number of times that the function has been executed, the time zone when the function is executed, the time during which the execution of the function has been maintained, and/or information on another function that is executed together with the function. According to various embodiments, the execution information stored in the storage unit 130 may be updated when a function is executed or when the executed function is completed.

The display unit 140 may output display data. In this case, the display unit 140 may display an execution screen that corresponds to at least one of a plurality of functions of the electronic device. According to an embodiment, the display unit 140 may include a Liquid Crystal Display (LCD), a Light Emitting Diode (LED) display, an Organic LED (OLED) display, a Micro ElectroMechanical System (MEMS) display, and an electronic paper display. According to various embodiments, the display unit 140, together with the input unit 120, may be implemented as a touch screen. In this case, the display unit 140 may detect input data for requesting the split of a screen, an input for reconfiguring split screens, and the like.

The controller 150 may control an overall operation of the electronic device 100. According to various embodiments, the controller 150 may analyze a split-screen input to split a screen and may display, on the split screens, execution screens corresponding to functions that satisfy a condition. According to various embodiments, the split-screen input may be a multi-touch or a single-touch on the display unit 140. According to an embodiment, the controller 150 may determine the number of split screens based on at least one of the number of input points, the number of inputs, an input time, a moving distance of the input, and a moving direction of the input. According to various embodiments, the functions satisfying a condition may include at least one of a frequently executed function, a function having a priority according to a name among the functions provided by the electronic device, and a recently executed function.

According to various embodiments, the controller 150 may include a screen controller 200, and may control the screen controller 200 to perform the aforementioned operation.

According to another embodiment, the controller 150 may refer to a processor that executes one or more software programs stored in a memory device. For example, the aforementioned operation of the controller 150 may be executed by a software program that is executed by a processor.

Figure 2:
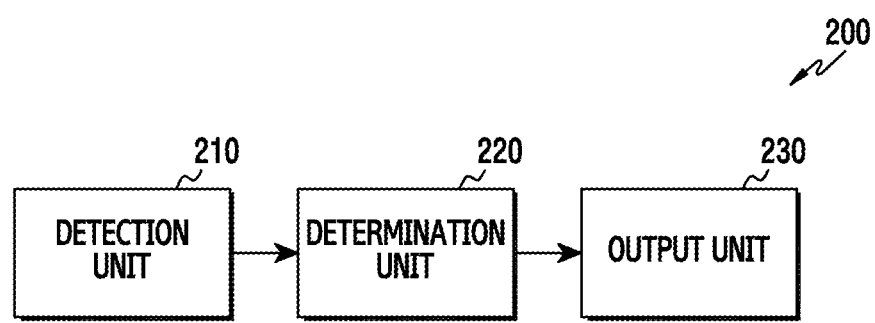
FIG. 2 illustrates the configuration of a screen controller in the electronic device, according to various embodiments of the present disclosure.

FIG. 2 illustrates the configuration of the screen controller 200 of the electronic device, according to various embodiments of the present disclosure. According to various embodiments, the screen controller 200 may be included in the controller 150 of the electronic device.

According to various embodiments, the screen controller 200 may include a detection unit 210 (or detector), a determination unit 220 (or determination device), and an output unit 230 (or output device).

Referring to FIG. 2, the detection unit 210 may detect an input for requesting the split of a screen (e.g., a split-screen input). According to an embodiment, a split-screen screen input may be defined as a touch type of input, and in this case, the detection unit 210 may detect the split-screen input through a sensor (for example, a touch screen) that may detect an input using a body part or an electronic pen. According to various embodiments, the detection unit 210 may detect a direct input (e.g., a direct touch) or an indirect input (e.g., a proximity touch) using a body part or an electronic pen.

According to another embodiment, a split-screen input may be associated with at least one of a voice input, a gesture input, and a button input, in addition to a touch input. For example, the detection unit 210 may detect a voice type of split-screen input through a microphone. In another example, the detection unit 210 may detect a gesture type of split-screen input through a sensor that can detect a motion. In yet another example, the detection unit 210 may also detect a split-screen input in connection with a button (for example, a power button, a volume button, etc.) that generates a specific instruction.

The determination unit 220 may analyze an input for splitting a screen to determine the number of split screens. According to an embodiment, the determination unit 220 may determine the number of split screens in response to the detection of a touch-type input. In this case, the determination unit 220 may calculate at least one of the number of touch input points, the number of inputs, an input time, a touch moving distance, and/or a touch moving direction by detecting the input, and may use the same to determine the number of split screens.

Here, the number of touch input points may be associated with the number of fingers that generate a multi-touch, and the determination unit 220 may determine the number of touch input points to be the number of split screens. For example, the determination unit 220 may determine to display two split screens in response to the detection of a touch input using two fingers (for example, a split-screen input).

In addition, the number of inputs may be associated with touch inputs that have been detected for a pre-defined period of time, and the determination unit 220 may compare the number of inputs and a threshold value to determine the number of split screens. Here, the threshold value, the number of touch inputs that defines the number of split screens, may include a first threshold value associated with two split screens, a second threshold value associated with three split screens, a third threshold value associated with four split screens, and the like. For example, when detecting the number of touches (for example, two touches) that correspond to the first threshold value, the determination unit 220 may determine to display two split screens.

The determination unit 220 may determine the number of split screens based on a touch input time, a touch moving distance, a touch moving direction, etc. by using the same or a similar method to the method of using the number of inputs.

According to various embodiments, the determination unit 220 may determine and/or recommend functions that may be displayed on split screens, in addition to determining the number of split screens. According to an embodiment, the determination unit 220 may determine and/or recommend a function that includes at least one of a frequently executed function in the split of a screen, a function having a priority according to a name among the functions provided by the electronic device, and a recently executed function. According to another embodiment, when a split-screen request is generated by a separate input means, the determination unit 220 may determine and/or recommend a function associated with the input means. For example, the input means may be identified to be an electronic pen, and in this case, the determination unit 220 may determine and/or recommend a function (for example, a memo function) that a user may use with the electronic pen.

The output unit 230 may display split screens based on the number of screens that is determined by the determination unit 220. In addition, when a screen is split, the output unit 230 may display functions to be displayed on the split screens, for example, functions recommended by the determination unit 220.

A device for controlling a screen, according to various embodiments, may include: a display device or unit functionally connected to an electronic device; a detection device or unit that detects a multi-input signal; and a controller that displays the display area of the display device or unit that is split into a reference screen area and a split screen area in response to the detection of the multi-input signal, wherein the screen of a running function is displayed in the reference screen area, and the screen of a function to be executed is displayed in the split screen area.

According to various embodiments, the controller may display a recommended function that is to be displayed in the split screen area.

According to various embodiments, the controller may identify the recommended function based on at least one of a priority for an execution frequency, a priority for a name, and a priority for an execution time.

According to various embodiments, the controller, when splitting the display area into two or more split screen areas, may display at least one recommended function in respective ones of the split screen areas.

According to various embodiments, the controller may split the display area based on at least one of the number of touch input points, a moving distance of the touch input, a moving direction of the touch input, and the area of the touch input.

According to various embodiments, the controller may configure the size of the reference screen area based on the number of split screen areas.

According to various embodiments, the controller may use the reference screen area as a split screen area when the multi-input signal is detected in a state in which a function is not executed.

According to various embodiments, the controller may display preview information on the reference screen area and the split screen area before splitting the display area.

According to various embodiments, the detection device or unit may detect a screen reconfiguration request. Further, the controller may change the location of the reference screen area in response to the screen reconfiguration request.

A device for controlling a screen, according to various embodiments, may include: a display device or unit functionally connected to an electronic device; a detection device or unit that detects a single-input signal; and a controller that is configured to receive or determine information regarding at least one of a moving distance of the touch input, a moving direction of the touch input, and the area of the touch input in response to the detection of the single-input signal, and to cause the display area of the display device or unit to be split into a reference screen area and a split screen area based on the information. A screen of a running function may be displayed in the reference screen area and a screen of a function to be executed may be displayed in the split screen area.

According to various embodiments, the controller may display recommended functions that are to be displayed in the reference screen area and the split screen area.

According to various embodiments, the controller may identify a recommended function that contains at least one function associated with an input means having generated the single-input signal.

Figure 3:
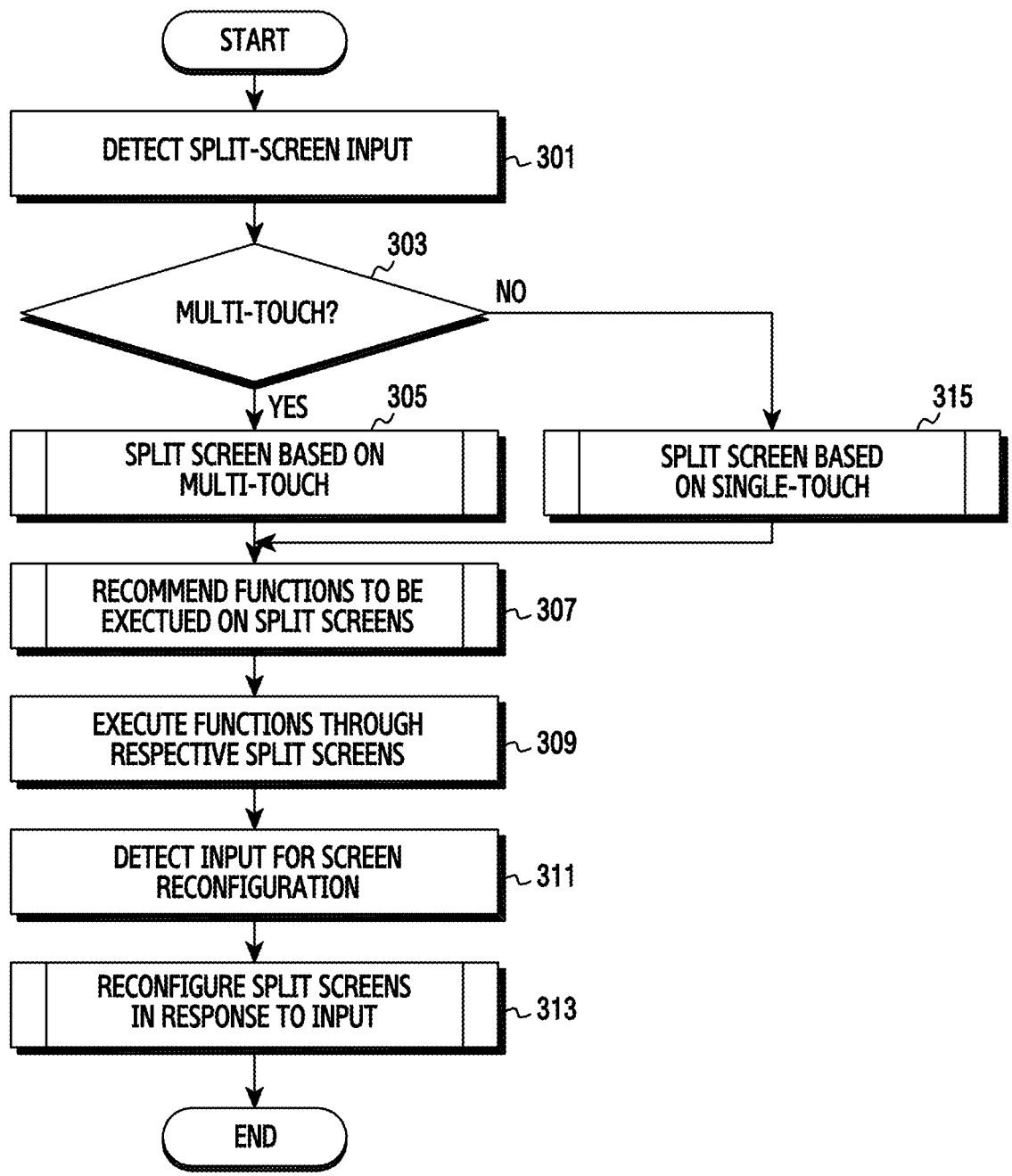
FIG. 3 is a flowchart illustrating a screen control procedure of the electronic device, according to various embodiments of the present disclosure.

FIG. 3 is a flowchart illustrating a screen control procedure of the electronic device, according to various embodiments of the present disclosure. FIGS. 5, 6, 8, 10, 11, and 13 illustrate examples for describing screen control methods according to various embodiments of the present disclosure.

In operation 301, the electronic device 100 may detect a split-screen input. According to another embodiment, the electronic device 100 may detect a split-screen input associated with at least one of a touch input, a voice input, a gesture input, and a button input. According to an embodiment, the electronic device 100 may detect a multi-touch type of split-screen input 503 or 513 as illustrated in FIG. 5 or may detect a single-touch type of split-screen input 803 or 823 as illustrated in FIG. 8.

In operation 303, the electronic device 100 may identify the type of the detected split-screen input. For example, the electronic device 100 may determine whether a multi-touch has been detected or whether a single-touch has been detected.

According to various embodiments of the present disclosure, when a multi-touch has been detected, the electronic device 100 may split a screen based on the multi-touch in operation 305. In this case, the electronic device 100 may analyze the detected multi-touch to calculate at least one of the number of touch input points, a moving distance of the touch, and a moving direction of the touch, and may split the screen based on the calculation. Here, the splitting of the screen may correspond to splitting a display area into a reference screen area for displaying the screen of a running function and a split screen area for displaying the screen of a function that is newly executed according to the split of the screen.

Figure 4:
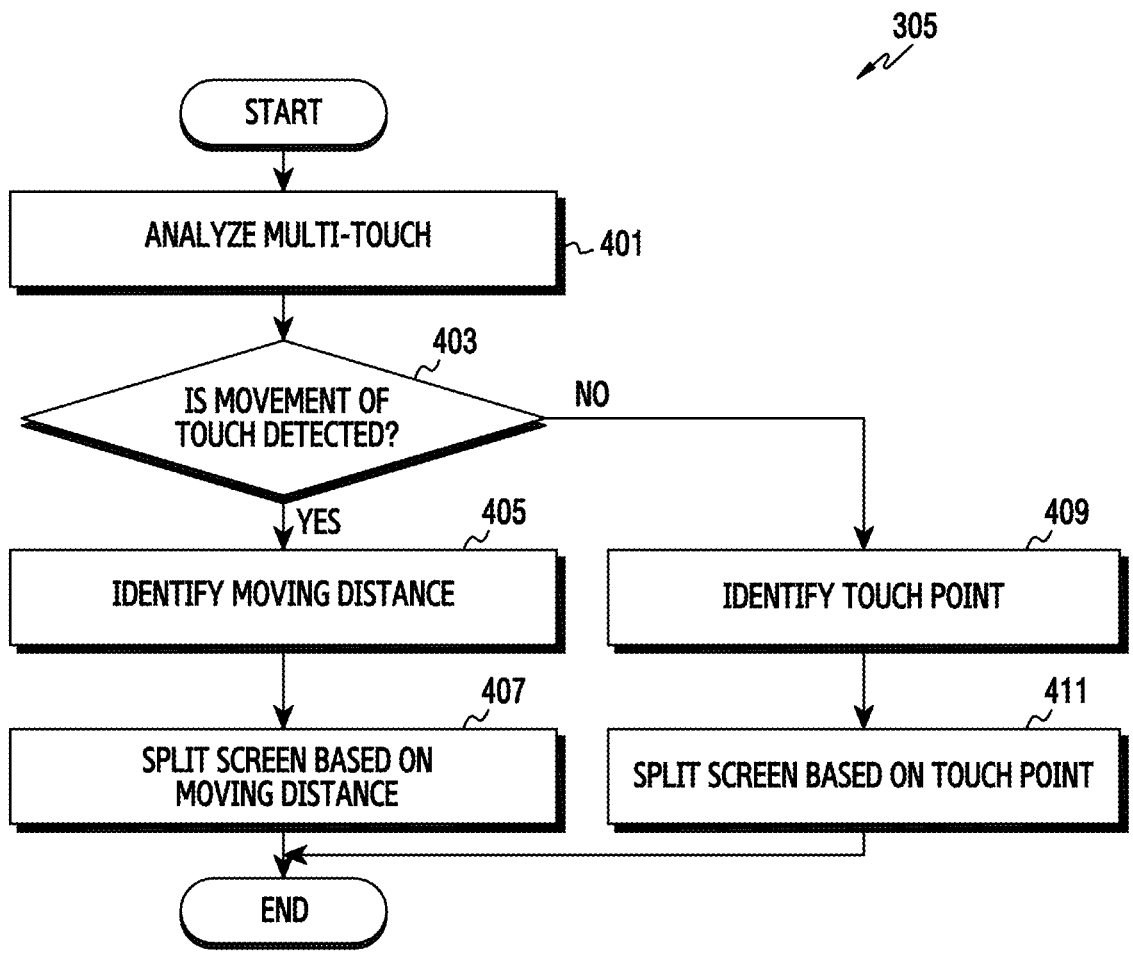
FIG. 4 is a flowchart illustrating a procedure of splitting a display area based on a multi-touch, according to an embodiment of the present disclosure.

FIG. 4 is a flowchart illustrating a procedure in which the operation of splitting the display area based on the multi-touch in FIG. 3 is performed, according to an embodiment of the present disclosure.

Referring to FIG. 4, the electronic device 100 may analyze the multi-touch in operation 401. According to various embodiments, the electronic device 100 may calculate the touch points (for example, the locations where the touch inputs have been generated). In addition, the electronic device 100 may calculate at least one of the moving distance, direction, and speed of the touch inputs based on the change of the touch points.

In operation 403, the electronic device 100 may determine whether the touch inputs are detected to move. Here, the movement of the touch inputs may correspond to changing the touch points on the display while maintaining the touch inputs (that is, they remain in contact with the display). According to an embodiment, the electronic device 100 may define a threshold value for determining the movement of the touch inputs. In this case, when the moving distance of the touch inputs is less than the threshold value, the electronic device 100 may determine that the movement of the touch inputs has not been detected.

Figure 5A:
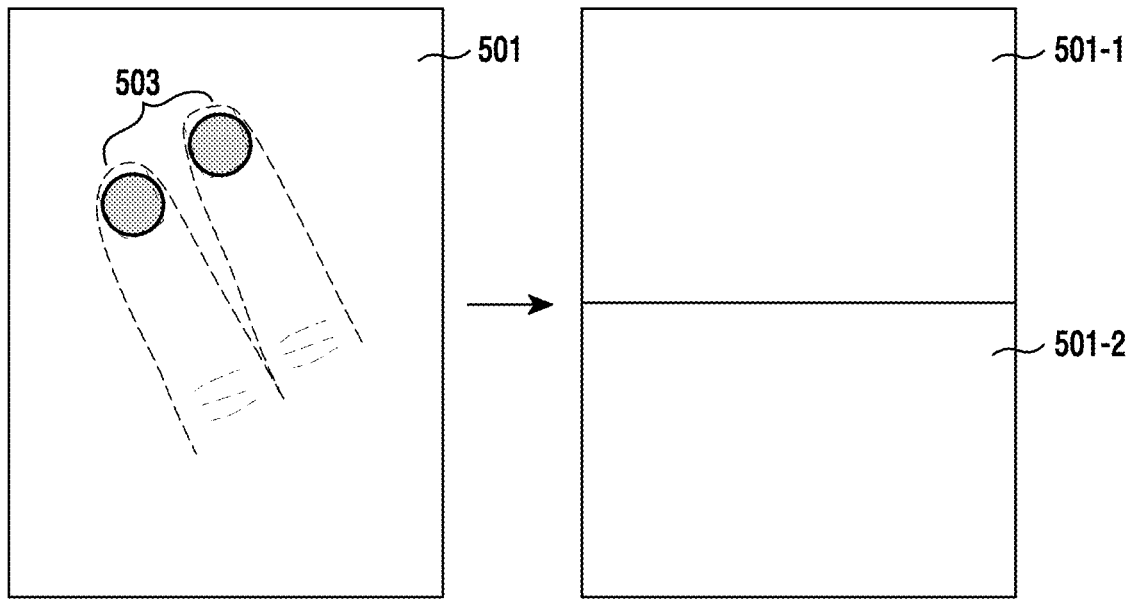
FIG. 5A and FIG. 5B illustrate examples of splitting a display area based on a touch, according to various embodiments of the present disclosure.
Figure 5B:
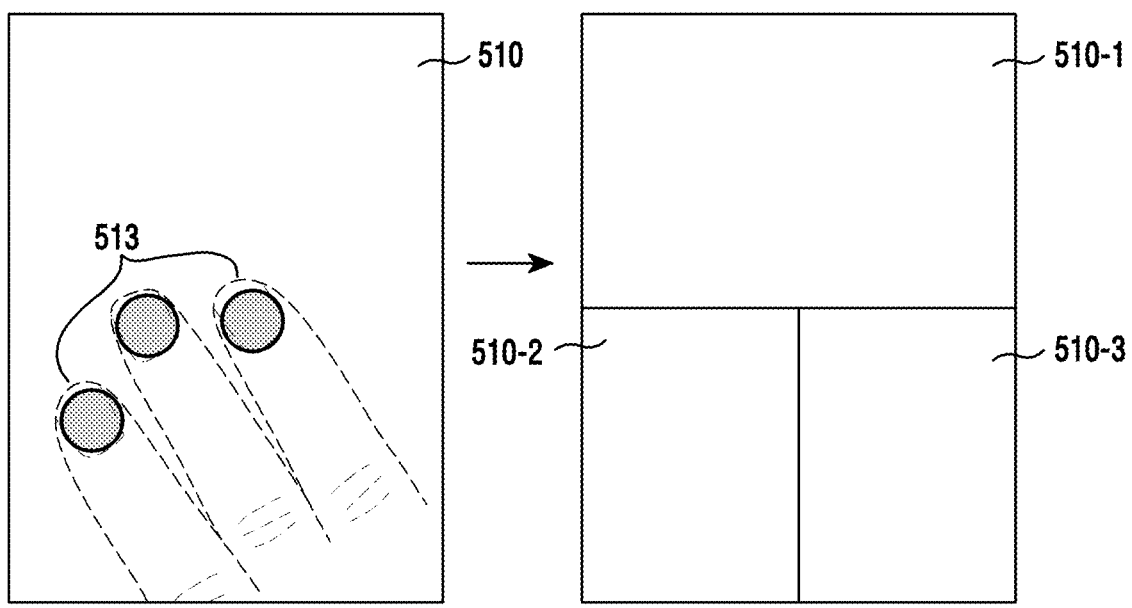

According to various embodiments, when the electronic device 100 determines that the movement of the touch inputs has not been detected, the electronic device 100 may identify the touch points in operation 409 and may perform an operation of splitting the screen based on the touch points in operation 411. According to various embodiments, the electronic device 100 may split the screen in the same number as that of the touch points. As a result, a user may increase the number of split screens while increasing the number of touch points. Namely, as illustrated in FIGS. 5A and 5B, the electronic device 100 may split a display area 501 into two areas (for example, a first display area 501-1 and a second display area 501-2) in response to the detection of the touch input 503 using two fingers. In this case, the first display area 501-1 may be a reference screen area, and the second display area 501-2 may be a split screen area.

In another example, the electronic device 100 may split a display area 510 into three areas (for example, a first display area 510-1, a second display area 510-2, and a third display area 510-3) in response to the detection of the touch input 513 using three fingers. In this case, the first display area 510-1 may be a reference screen area, and the second and third display areas 510-2 and 510-3 may be split screen areas. In addition, all the split screens may have the same size, or only at least some of the split screens may have the same size. For example, as the number of split screen areas increases, the size of the reference screen area may decrease.

According to various embodiments, when determining that the movement of the touch inputs has been detected, the electronic device 100 may identify the moving distance of the touch inputs in operation 405 and may perform an operation of splitting the screen based on the moving distance in operation 407. According to various embodiments, the electronic device 100 may define the number of split screens for each moving distance. For example, the electronic device 100 may increase the number of split screens based on a predetermined distance (for example, 10 pixels). As a result, a user may increase the number of split screens while increasing the moving distance.

Figure 6C:
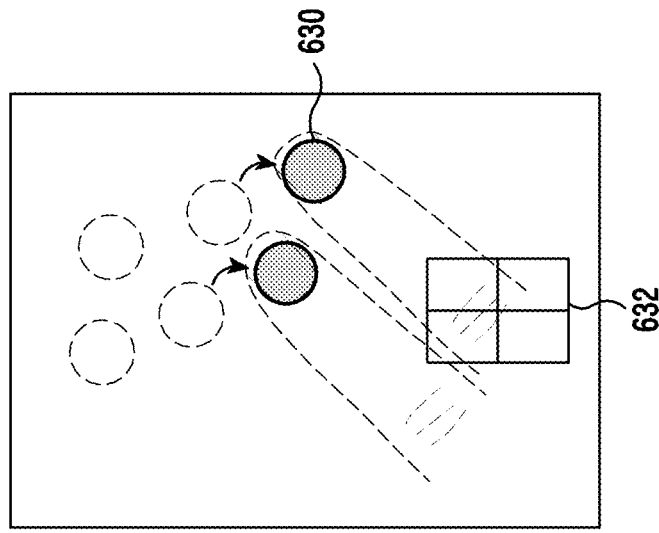
FIG. 6A, FIG. 6B and FIG. 6C illustrate an example of a method of splitting a display area based on a multi-touch, according to various embodiments of the present disclosure.
Figure 6B:
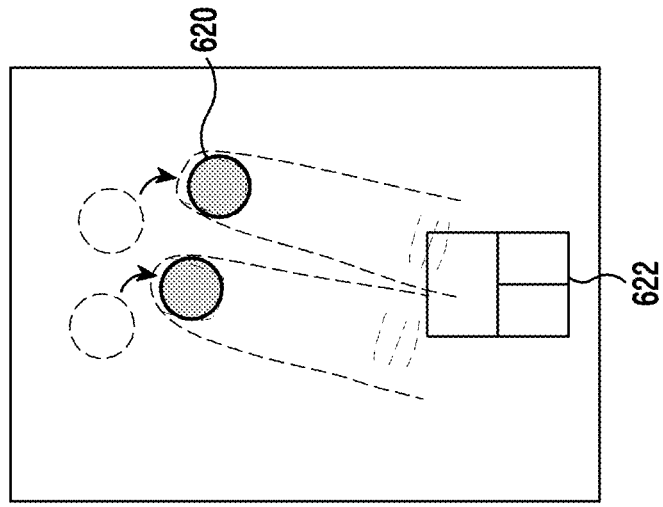
Figure 6A:
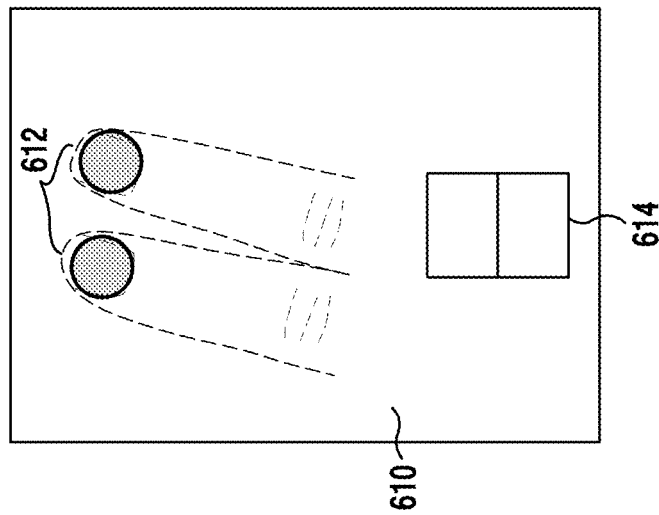

In this case, the electronic device 100 may provide preview information for the split screens before splitting the screen. Here, the preview information may be information on a moving state or may be information on the screen that is to be split according to the movement. Namely, as illustrated in FIGS. 6A-6C, the electronic device 100 may: (a) display preview information 614 indicating that a display area 610 is to be split into two areas when detecting a touch movement 612 that corresponds to a first moving distance; (b) display preview information 622 indicating that the display area is to be split into three areas when detecting a touch movement 620 that corresponds to a second moving distance; and/or (c) display preview information 632 indicating that the display area is to be split into four areas when detecting a touch movement 630 that corresponds to a third moving distance.

Accordingly, a user may directly identify the moving distance for the split of the screen, and may make a process to split the screen by releasing the touch inputs at a desired location. The displaying of the preview information, which has been described with reference to FIG. 6, is an example, and the electronic device 100, according to the various embodiments of the present disclosure, may split the screen in a number of split screen areas that corresponds to a moving distance without displaying preview information.

The electronic device 100, according to the various embodiments of the present disclosure, may return to FIG. 3 after performing the operation of splitting the screen based on the moving distance in operation 407. Alternatively, the electronic device 100 may return to FIG. 3 after performing the operation of splitting the screen based on the touch points in operation 411.

According to various embodiments, the electronic device 100, when detecting a single touch, may split the display area based on the single touch in operation 315. In this case, the electronic device 100 may analyze the detected single touch to calculate at least one of the touch point and the moving distance and moving direction of the touch, and may split the screen based on the calculation.

Figure 7:
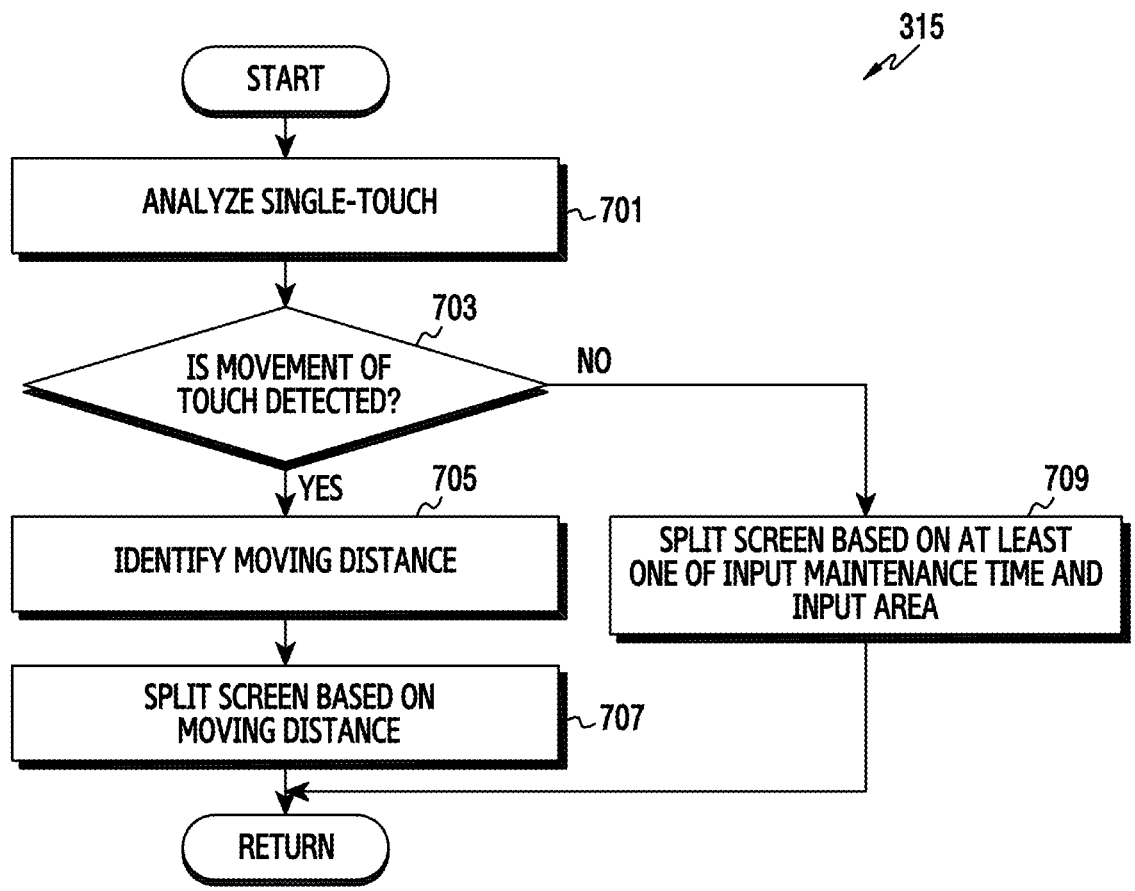
FIG. 7 is a flowchart illustrating a procedure in which the operation of splitting a screen based on a single-touch in FIG. 3 is performed, according to an embodiment of the present disclosure.

FIG. 7 is a flowchart illustrating a procedure in which the operation of splitting the screen based on the single-touch in FIG. 3 is performed, according to an embodiment of the present disclosure.

Referring to FIG. 7, the electronic device 100 may analyze the single-touch in operation 701. Here, the single-touch may be an input using a body part or an input means, such as an electronic pen. According to various embodiments, the electronic device 100 may calculate the touch point (for example, the location where the touch input has been generated). In addition, the electronic device 100 may calculate at least one of the moving distance, direction, speed, the input maintenance time, and/or the input area of the touch based on the change of the touch point.

In operation 703, the electronic device 100 may determine whether the movement of the touch input is detected. Here, the movement of the touch input may correspond to changing the touch point while maintaining the touch input on one point.

Figure 8A:
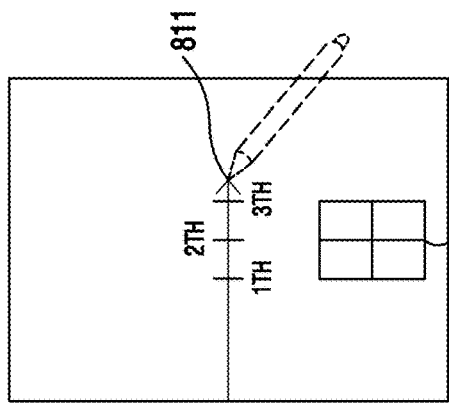
FIG. 8A, FIG. 8B, FIG. 8C, FIG. 8D, FIG. 8E and FIG. 8F illustrate an example of a method of splitting a display area based on a single-touch, according to various embodiments of the present disclosure.
Figure 8B:
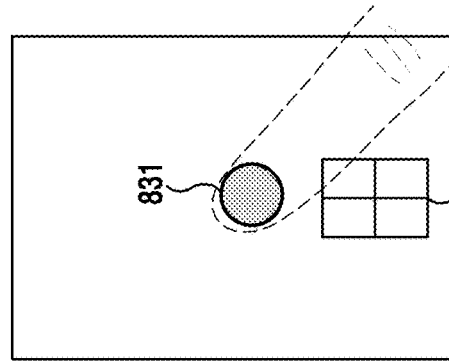
Figure 8C:
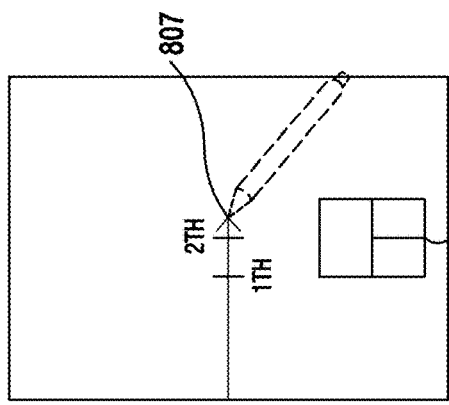

According to various embodiments, when the movement of the touch input is detected, the electronic device 100 may identify the moving distance in operation 705, and may split the screen based on the moving distance in operation 707. According to an embodiment, the electronic device 100 may define the number of split screens for each moving distance of the single-touch. For example, the electronic device 100 may increase the number of split screens based on a predetermined distance (for example, 10 pixels). Namely, as illustrated in FIG. 8, the electronic device 100 may: (a) split a screen 801 into two display areas when detecting a movement 803 of a touch input that is greater than a first threshold value (FIG. 8A); (b) split the screen into three display areas when detecting a movement 807 of the touch input that is greater than a second threshold value (FIG. 8B); and (c) split the screen into four display areas when detecting a movement 811 of the touch input that is greater than a third threshold value (FIG. 8C). In this case, the electronic device 100, before splitting the screen, may display preview information 805, 809, or 813 for the screen to be split.

Figure 8D:
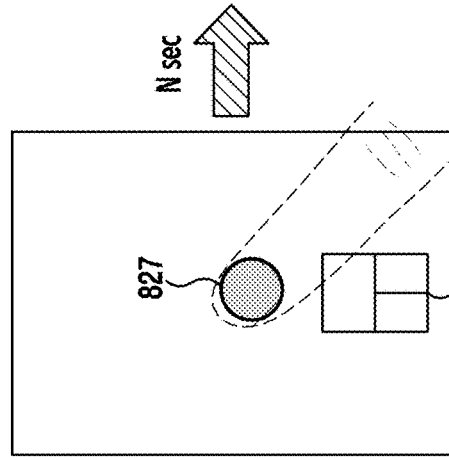
Figure 8E:
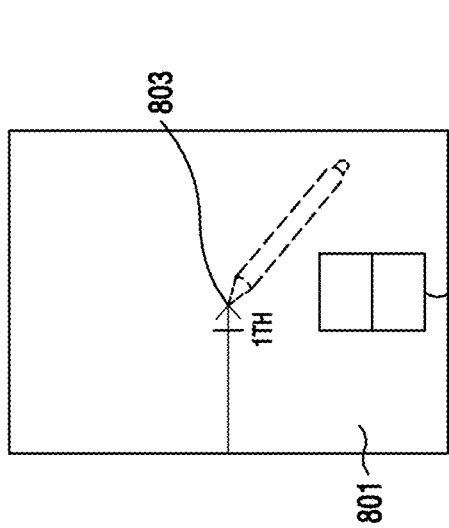
Figure 8F:
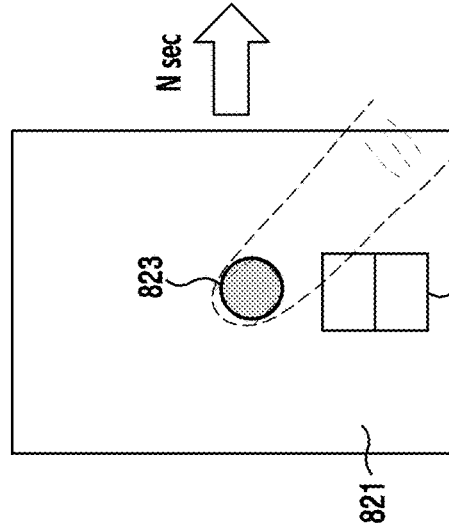

According to various embodiments, when the movement of the touch input is not detected, the electronic device 100 may calculate at least one of the input maintenance time and the input area, and may split the screen based on the calculated information in operation 709. For example, as illustrated in FIG. 8, when splitting the screen based on the input maintenance time, the electronic device 100 may: (a) split a screen 821 into two display areas as indicated by reference numeral 825 when a touch input 823 corresponding to a first threshold value is maintained (FIG. 8D); (b) split the screen into three display areas as indicated by reference numeral 829 when a touch input 827 corresponding to a second threshold value is maintained (FIG. 8E); and (c) split the screen into four display areas as indicated by reference numeral 833 when a touch input 831 corresponding to a third threshold value is maintained (FIG. 8F). In another example, when splitting the screen based on the input area, the electronic device 100, although not illustrated, may: (a) split a display area into two areas in response to the detection of an input area corresponding to a first threshold value; and/or (b) split the display area into three or four areas in response to the detection of an input area corresponding to a second or third threshold value.

The electronic device 100, according to the various embodiments of the present disclosure, may return to FIG. 3 after splitting the screen based on the moving distance of the single-touch. Alternatively, the electronic device 100 may return to FIG. 3 after splitting the screen based on at least one of the input maintenance time and the input area of the single-touch.

According to various embodiments of the present disclosure, in operation 307, the electronic device 100 may recommend functions that may be executed on the split screens after splitting the screen by detecting the multi-touch input in operation 305, or after splitting the screen by detecting the single-touch input in operation 315. Here, the functions may be interpreted as having the same meaning as applications, execution screens of applications, etc.

Figure 9:
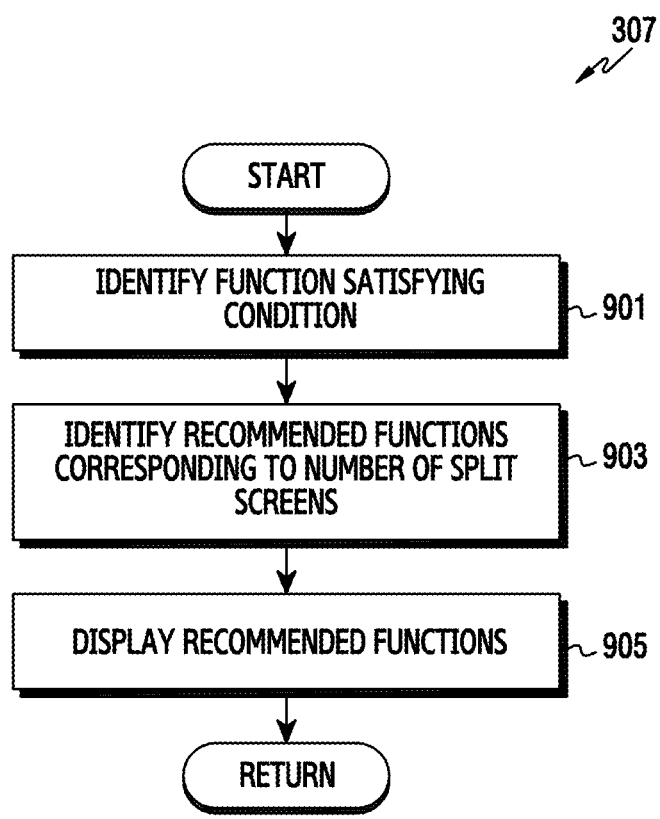
FIG. 9 is a flowchart illustrating a performance procedure of an operation of recommending functions to be executed in split screens, according to various embodiments of the present disclosure.

FIG. 9 is a flowchart illustrating a procedure in which the operation of recommending functions to be executed in the split screens in FIG. 3 is performed, according to various embodiments of the present disclosure.

Referring to FIG. 9, in operation 901, the electronic device 100 may identify functions satisfying one or more conditions in order to recommend functions that may be executed on the split screens. Here, the functions satisfying a condition may be associated with priorities (for example, priorities for an execution frequency, priorities for names, priorities for execution time, etc.). Namely, the functions satisfying a condition may include a frequently executed function, a function having a priority according to a name among the functions provided by the electronic device, a recently executed function, etc. According to various embodiments, the electronic device 100 may store execution information for the functions. For example, for each function, the electronic device 100 may manage at least one of the number of times that the function has been executed, the time zone when the function is executed, the time during which the execution of the function has been maintained, and information on another function that is executed together with the function.

In operation 903, the electronic device 100 may identify the recommended functions that correspond to the number of split screens. Here, the recommended functions may be a list of functions that may be executed in the respective split screens.

In operation 905, the electronic device 100 may display the recommended functions on the screen. In this case, the electronic device 100 may display, on the screen, a recommendation window that includes at least one recommended function. Here, the recommended functions may be a combination of one or more functions. The number of combined functions may be the number of split screens on which new functions may be displayed.

Figure 10A:
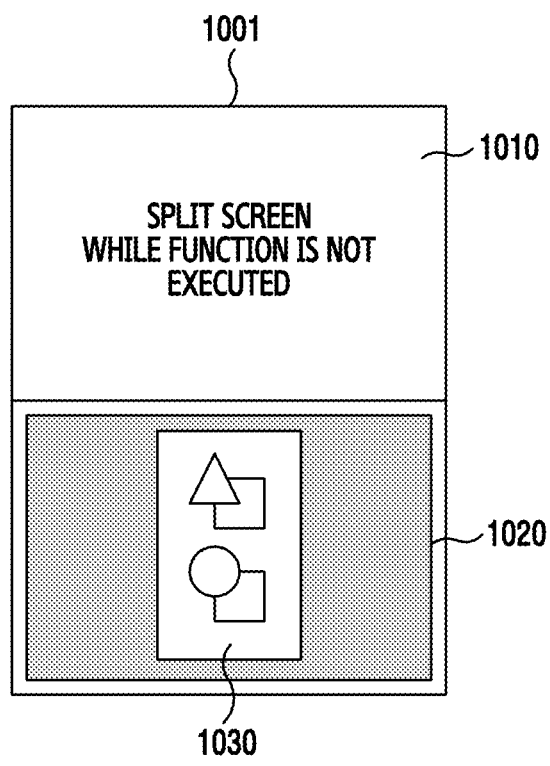
FIG. 10A and FIG. 10B illustrate an example of a method of recommending functions to be executed on split screens, according to various embodiments of the present disclosure.
Figure 10B:
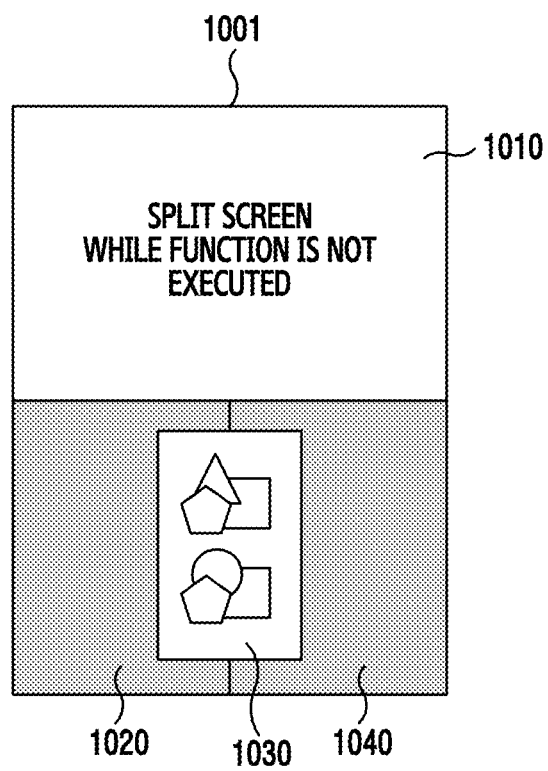

For example, in cases where a screen is split while an execution screen is not displayed, new functions may be displayed on all split screens. Namely, as illustrated in FIGS. 10A and 10B, while an execution screen is not displayed, the electronic device 100 may display a recommendation window 1030 that may include recommended functions obtained by a combination of functions to be displayed in a first area 1010 and functions to be displayed in a second area 1020 when a screen 1001 is split into two areas, and may display a recommendation window 1030 that includes recommended functions obtained by a combination of functions to be displayed in the first area 1010, functions to be displayed in the second area 1020, and functions to be displayed in a third area 1040 when the screen 1001 is split into three areas (FIG. 10B).

Figure 11A:
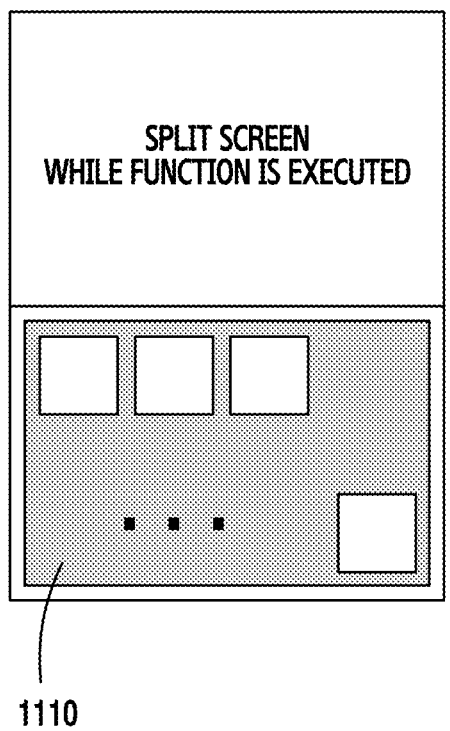
FIG. 11A and FIG. 11B illustrate an example of a method of recommending functions to be executed on split screens, according to various embodiments of the present disclosure.
Figure 11B:
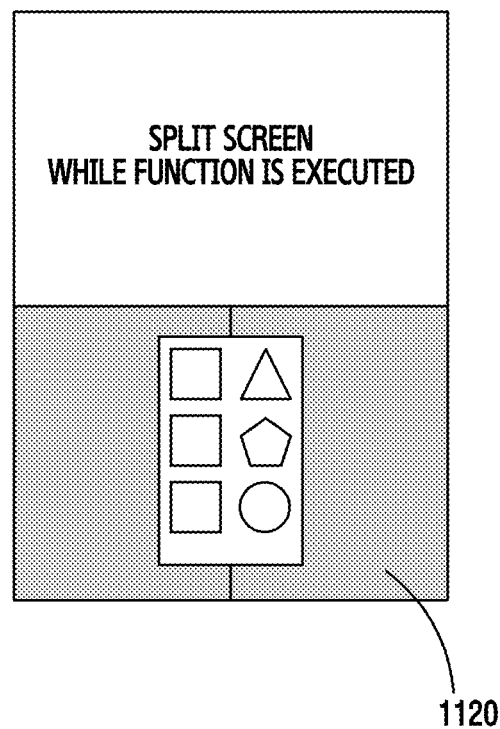

In another example, in cases where a screen is split while an execution screen is displayed, new functions may be displayed on the remaining split screens other than one split screen for which the display of the execution screen has to be maintained. Namely, as illustrated in FIGS. 11A-11B, while an execution screen is displayed, the electronic device 100 may display a recommendation window, as indicated by reference numeral 1110 (FIG. 11A), which includes recommended functions obtained by a combination of functions to be displayed in the second display area when a screen is split into two areas, and may display a recommendation window, as indicated by reference numeral 1120 (FIG. 11B), which may include recommended functions obtained by a combination of functions to be displayed in the second area and functions to be displayed in the third area when a screen is split into three areas. In this case, the electronic device 100 may display, in the first area, the existing execution screen that has been displayed before the split of the screen.

According to various embodiments of the present disclosure, the electronic device 100 may return to FIG. 3 after displaying the recommended functions for the split screens.

According to various embodiments of the present disclosure, in operation 309, the electronic device 100 may execute the functions through the respective split screens after recommending the functions to be executed on the split screens in operation 307. Here, the functions executed through the respective split screens may be functions selected by a user among the functions that have been recommended in operation 307. In addition, the selected functions may be recommended functions obtained by a combination of two or more functions. In this case, the locations of the split screens on which the functions that are integrated in the recommended functions are to be executed may be defined.

In operation 311, the electronic device 100 may detect an input for screen reconfiguration. Here, the input for screen reconfiguration may be a touch input on a screen.

In operation 313, the electronic device 100 may reconfigure the split screens in response to the input. Here, the reconfiguration of the split screens may correspond to changing the arrangement (for example, locations) of the split screens.

Figure 12:
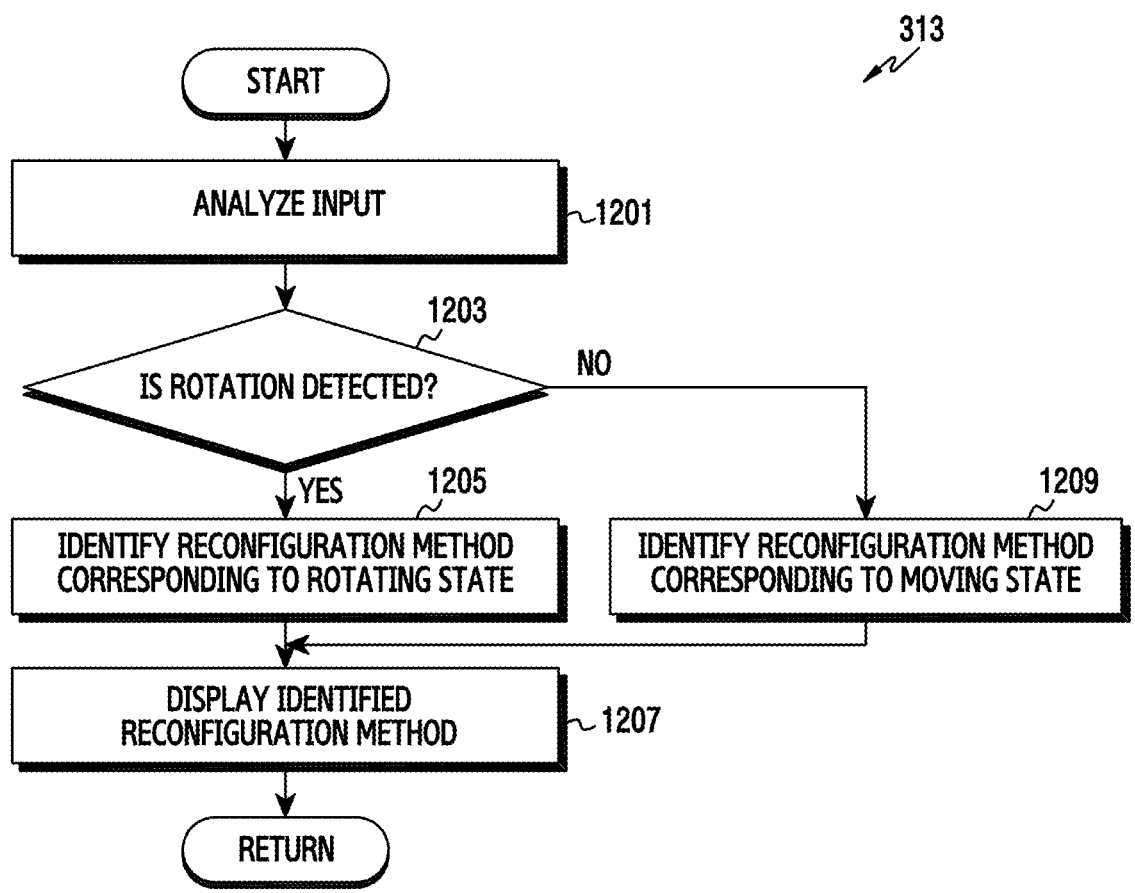
FIG. 12 is a flowchart illustrating a procedure in which the operation of reconfiguring the split screens in FIG. 3 is performed, according to various embodiments of the present disclosure.
Figure 13C:
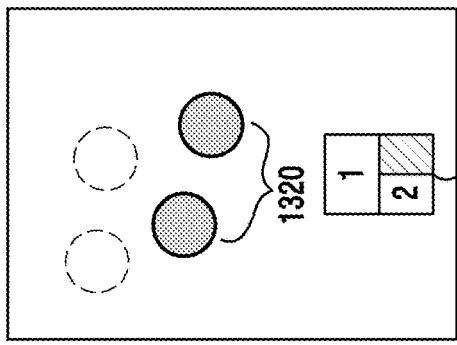
FIG. 13A, FIG. 13B, FIG. 13C and FIG. 13D illustrate examples of a method of reconfiguring split screens, according to various embodiments of the present disclosure.
Figure 13B:
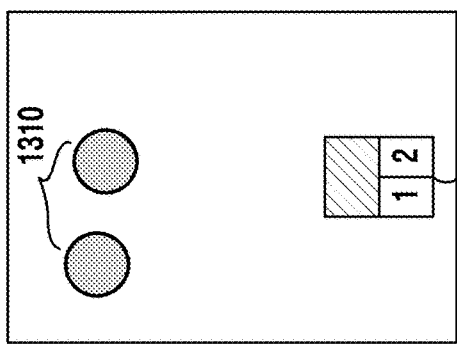
Figure 13A:
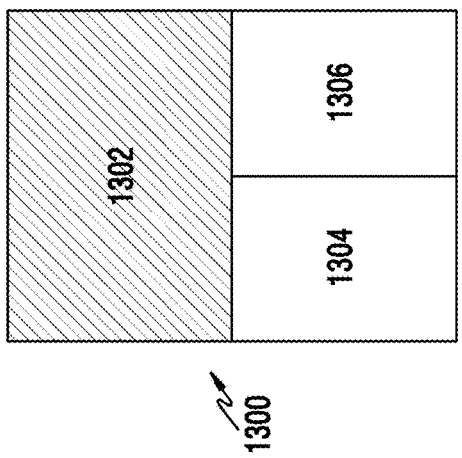
Figure 13D:
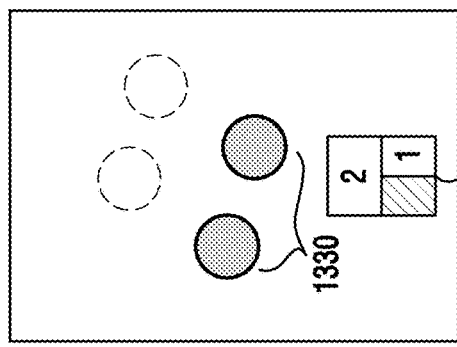

FIG. 12 is a flowchart illustrating a procedure in which the operation of reconfiguring the split screens in FIG. 3 is performed, according to various embodiments of the present disclosure.

Referring to FIG. 12, in operation 1201, the electronic device 100 may analyze a user input for reconfiguring the split screens. In this case, the electronic device 100 may calculate at least one of the location and the speed of the input.

In operation 1203, the electronic device 100 may identify the type of input through the analysis in operation 1201. For example, based on the calculated information, the electronic device 100 may at least determine one of whether a rotating input has been detected and/or whether a moving input has been detected.

According to various embodiments, in cases where a rotating input is detected, the electronic device 100 may identify a reconfiguration method corresponding to the rotating state in operation 1205. According to an embodiment, the reconfiguration method may be a changed arrangement of screens. For example, the electronic device 100 may identify a screen arrangement state corresponding to the extent of rotation.

According to various embodiments, in cases where a moving input is detected, the electronic device 100 may identify a reconfiguration method corresponding to the moving state in operation 1209. For example, the electronic device 100 may identify a screen arrangement state corresponding to an extent of movement.

According to various embodiments, after identifying the reconfiguration method corresponding to the rotating input or the moving input, the electronic device 100 may reconfigure the split screens according to the reconfiguration method identified in operation 1207. For example, as illustrated in FIGS. 13A-13D, it may be assumed that a screen is split into first to third areas 1302, 1304, and 1306 as indicated by reference numeral 1300 wherein the first area 1302 is defined as a reference area, and the second and third areas 1304 and 1306 are defined as split areas. The shaded portion in the drawing refers to the location of the reference area. In this case, the electronic device 100 may change the location of the reference area according to an input movement location. Namely, when the movement of an input to a first location is detected (1310), the reference area may be maintained in a location in the first area (1312), and when the movement of the input to a second location is detected (1320), the reference area of the first area may be moved to the third area (1322). Further, when the movement of the input to a third location is detected (1330), the reference area may move to the second area.

According to various embodiments of the present disclosure, the electronic device 100 may return to FIG. 3 after reconfiguring the split screens.

Figure 14A:
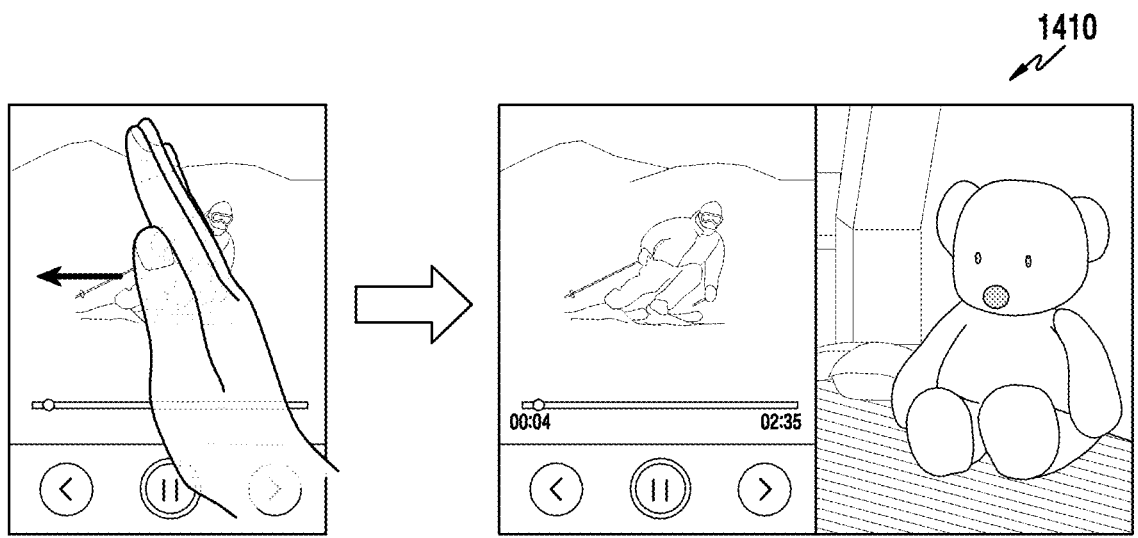
FIG. 14A, FIG. 14B and FIG. 14C illustrate a screen control situations of the electronic device, according to various embodiments of the present disclosure.
Figure 14B:
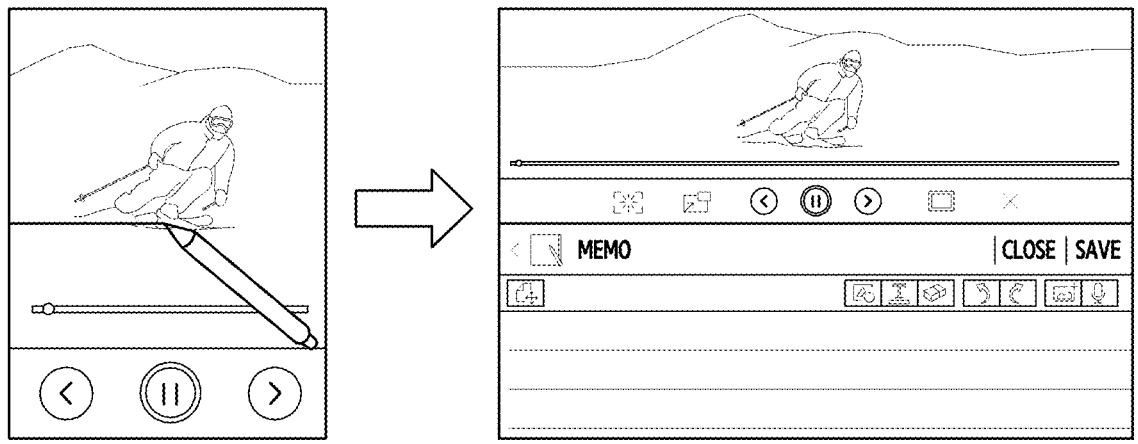
Figure 14C:
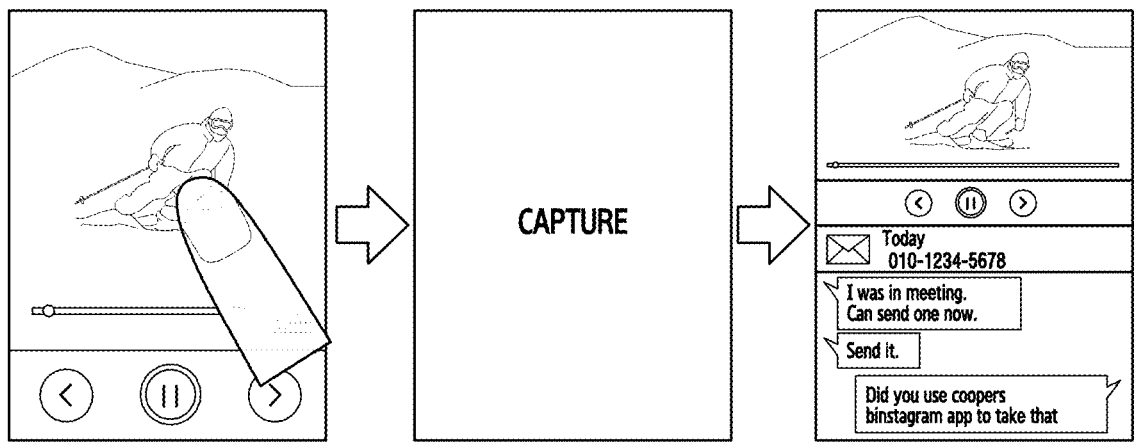

FIGS. 14A-14C illustrates a screen control situation of the electronic device, according to various embodiments of the present disclosure.

According to various embodiments of the present disclosure, the electronic device 100 may detect the movement of an input using a hand knife and may split a screen based on the movement of the input. This may correspond to the operation of splitting the screen based on the moving distance of the multi-touch in operation 407 of FIG. 4. Further, the electronic device 100 may display the existing execution screen in one area of the split screens and may display an execution screen for a new function in the other area (1410). In this case, the electronic device 100 may define the location of the existing execution screen based on a direction in which a touch moves. For example, as illustrated in FIG. 14A, the electronic device 100 may define the left area among the split areas as the location of the existing execution screen when detecting an input that moves to the left.

According to various embodiments of the present disclosure, the electronic device 100 may detect the movement of an input using an electronic pen and may split a screen based on the movement of the input. This may correspond to the operation of splitting the screen based on the moving distance of the single-touch in operation 707 of FIG. 7. Further, the electronic device 100 may display the existing execution screen in one area of the split screens and may display a function associated with the input means in the other area. For example, as illustrated in FIG. 14B, the electronic device 100 may display a memo function associated with the electronic pen on the split screen (1420).

According to various embodiments of the present disclosure, the electronic device 100 may detect the area of a single-touch and may split a screen based on the area of the touch. This may correspond to the operation of splitting the screen based on the area of the single-touch in operation 709 of FIG. 7. Further, the electronic device 100 may perform a specific operation through the split screen based on the detection of a pre-defined area. For example, as illustrated in FIG. 14C, the electronic device 100 may capture the screen in response to the area of the touch and may display a function (for example, a message function) of transmitting the captured screen on the split screen (1430).

A method of controlling a screen, according to various embodiments, may include: detecting a multi-input signal; and splitting a display area into a reference screen area and a split screen area in response to the detection of the multi-input signal, wherein the screen of a running function is displayed in the reference screen area, and the screen of a function to be executed is displayed in the split screen area.

According to various embodiments, the method may further include displaying a recommended function that is to be displayed in the split screen area after the splitting of the display area.

According to various embodiments, the recommended function may be identified based on various information including at least one of a priority for an execution frequency, a priority for a name, and a priority for an execution time.

According to various embodiments, the displaying of the recommended function may include, when splitting the display area into two or more split screen areas, displaying at least one recommended function obtained by a combination of functions to be displayed on the respective split screen areas.

According to various embodiments, the splitting of the display area may include splitting the display area based on at least one of the number of touch input points, a moving distance of the touch input, a moving direction of the touch input, and the area of the touch input.

According to various embodiments, the splitting of the display area may include configuring the size of the reference screen area based on the number of split screen areas.

According to various embodiments, the splitting of the display area may include displaying preview information on the reference screen area and the split screen area before splitting the display area.

According to various embodiments, the method may further include: detecting a screen reconfiguration request after splitting the display area; and changing the location of the reference screen area in response to the screen reconfiguration request.

A method of controlling a screen, according to various embodiments, may include: detecting a single-input signal; and analyzing at least one of a moving distance of the touch input, a moving direction of the touch input, and the area of the touch input in response to the detection of the single-input signal and displaying the display area of the display device or unit that is split into a reference screen area and a split screen area based on the analysis result, wherein the screen of a running function is displayed in the reference screen area, and the screen of a function to be executed is displayed in the split screen area.

According to various embodiments, the method may further include displaying recommended functions that are to be displayed in the reference screen area and the split screen area. According to various embodiments, the method may further include displaying a recommended function that contains at least one function associated with an input means having generated the single-input signal.

The method of controlling a screen and the electronic device for processing the method, according to the various embodiments of the present disclosure, can determine the number of split screens based on at least one of the number of touch input points, the number of inputs, an input time, a moving distance of the input, and a moving direction of the input, thereby enabling a user to efficiently split a screen.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for".

Various embodiments of the present disclosure disclosed in the specification and the drawings are only particular examples to easily describe the technical matters of the present disclosure and assist in the understanding of the present disclosure, and do not limit the scope of the present disclosure. Therefore, it should be construed that, in addition to the embodiments disclosed herein, all modifications and changes or modified and changed forms derived from the technical idea of the present disclosure fall within the scope of the present disclosure.

What is claimed is:

1. An electronic device for controlling a screen, comprising:
   a touch screen configured to display content and to detect a multi-input signal including at least two touch inputs; and
   a controller configured to:
   identify a distance by which the at least two touch inputs move in the same direction while the multi-input signal is detected, and a direction of movement of the at least two touch inputs; and
   in response to the at least two touch inputs:
      split a first screen area of the touch screen into a number of display areas including a second screen area and a plurality of third screen areas, wherein the number of display areas singularly increases according to an increment of the distance,
      display preview information before splitting the first screen area, wherein the preview information indicates the number of areas into which the first screen area is to be split and is updated based on the increment of the distance while the multi-input signal is detected,
      display the content in the second screen area selected among the second screen area and the plurality of third screen areas as a main display area based on the direction of the movement of the at least two touch inputs, and
      display a recommendation window including a plurality of objects corresponding to a plurality of recommendation functions, wherein each of the plurality of recommendation functions includes a combination of functions including a function for each of the plurality of third screen areas.

2. The device of claim 1, wherein displaying the recommendation window comprises determining the plurality of recommendation functions.

3. The device of claim 2, wherein the plurality of recommendation functions are determined based on at east one condition selected from: an execution frequency, a name, and an execution time.

4. The device of claim 1, wherein the controller is configured to determine a size of the second screen area, based on the number of the plurality of third screen areas.

5. The device of claim 1, wherein the touch screen is configured to detect a screen reconfiguration request and the controller is further configured to change a location of the second screen area in response to the screen reconfiguration request.

6. An electronic device for controlling a screen, comprising:
   a touch screen configured to display content and detect a single-input signal including a touch input; and
   a controller configured to:
   identify a distance by which the touch input moves while the single-input signal is detected, and a direction of movement of at the touch input; and
   in response to the touch input:
      split a first screen area of the touch screen into a number of display areas including a second screen area and plurality of third screen areas, wherein the number of display areas singularly increases according to an increment of the distance,
      display preview information before splitting the first screen area, wherein the preview information indicates the number of areas into which the first screen area is to be split and is updated based on the increment of the distance while the single-input signal is detected,
      display the content in the second screen area selected among the second screen area and the plurality of third screen areas as a main display area based on the direction of the movement of the touch input, and
      display a recommendation window including a plurality of objects corresponding to a plurality of recommendation functions, wherein each of the plurality of recommendation functions includes a combination of functions including a function for each of the plurality of third screen areas.

7. The device of claim 6, wherein the controller is further configured to identify the recommendation functions, based on the single-input signal.

8. A method of controlling a screen, comprising:
   detecting, by a touch screen of an electronic device, a multi-input signal including at least two touch inputs, while the touch screen displays content;
   identifying, by a controller of the electronic device, a distance by which the at least two touch inputs move in the same direction while the multi-input signal is detected, and a direction of movement of the at least two touch inputs; and
   in response to the at least two touch inputs:
      splitting, by the controller, a first screen area of the touch screen into a number of display areas including a second screen area and a plurality of third screen areas, wherein the number of display areas singularly increases according to an increment of the distance,
      displaying preview information before splitting the first screen area, wherein the preview information indicates the number of areas into which the first screen area is to be split and is updated based on the increment of the distance while the multi-input signal is detected,
      displaying the content in the second screen area selected among the second screen area and the plurality of third screen areas as a main display area based on the direction of movement of the at least two touch inputs, and
      displaying a recommendation window including a plurality of objects corresponding to a plurality of recommendation functions, wherein each of the plurality of recommendation functions includes a combination of functions including a function for each of the plurality of third screen areas.

9. The method of claim 8, wherein the splitting of the first screen area comprises:
   determining a size of the second screen area, based on the number of the plurality of third screen areas.

10. The method of claim 8, further comprising:
detecting a screen reconfiguration request; and
changing a location of the second screen area in response to the screen reconfiguration request.

\* \* \* \* \*